(12) United States Patent  
Abouimrane et al.

(10) Patent No.: US 8,895,193 B2
(45) Date of Patent: Nov. 25, 2014

(54) PLASTIC CRYSTAL ELECTROLYTE WITH A BROAD POTENTIAL WINDOW

(75) Inventors: Ali Abouimrane, Woodbridge, IL (US); Isobel Davidson, Orleans (CA)

(73) Assignee: National Research Council of Canada, Ottawa, ON (CA)

( * ) Notice: Subject to any disclaimer, the term of this patent is extended or adjusted under 35 U.S.C. 154(b) by 1117 days.

(21) Appl. No.: 12/451,345

(22) PCT Filed: May 9, 2008

(86) PCT No.: PCT/CA2008/000869
§ 371 (c)(1),
(2), (4) Date: Nov. 9, 2009

(87) PCT Pub. No.: WO2008/138110
PCT Pub. Date: Nov. 20, 2008

(65) Prior Publication Data
US 2010/0119951 A1    May 13, 2010

Related U.S. Application Data

(60) Provisional application No. 60/924,387, filed on May 11, 2007.

(51) Int. Cl.
*H01M 6/18* (2006.01)
*H01M 10/0562* (2010.01)
(Continued)

(52) U.S. Cl.
CPC ............ *H01M 10/052* (2013.01); *H01M 4/382* (2013.01); *H01M 4/485* (2013.01);

(58) Field of Classification Search
CPC ........... H01M 4/38; H01M 4/40; H01M 4/48; H01M 4/50; H01M 4/52; H01M 4/58; H01M 4/587; H01M 4/382; H01M 4/505; H01M 4/525; H01M 10/36; H01M 10/052; H01M 10/0564; H01M 6/16; Y02T 10/7011; Y02E 60/122
USPC ............................................... 429/306; 556/7
See application file for complete search history.

(56) References Cited

U.S. PATENT DOCUMENTS 6,506,516 B1    1/2003    Wietelmann et al.

FOREIGN PATENT DOCUMENTS

| CA | 2435218 | * | 1/2005 | ............... H01B 1/06 |
| WO | WO 01-15258 | | 3/2001 | |

(Continued)

OTHER PUBLICATIONS

Wang et al. International Journal of Electrochemical Science vol. 1 2006 pp. 250-257.*

(Continued)

*Primary Examiner* — Patrick Ryan
*Assistant Examiner* — Aaron Greso
(74) *Attorney, Agent, or Firm* — Catherine Lemay

(57) ABSTRACT

A solid ionic electrolyte having an organic plastic crystal solvent (e.g. succinonitrile) doped with lithium bioxalato borate salt (LiBOB) may be used in an electrochemical device. Electrochemical devices are disclosed having a cathode, an anode, and a solid ionic electrolyte having a neutral organic plastic crystal solvent doped with LiBOB alone or in combination with another lithium salt. Such devices have a stable electrolyte interface over a broad potential window combined with high energy density delivery capacity and, in one example, the favorable properties of a neutral organic plastic crystal matrix such as succinonitrile.

19 Claims, 9 Drawing Sheets

(51) Int. Cl.
*C07F 5/02* (2006.01)
*H01M 10/052* (2010.01)
*H01M 4/38* (2006.01)
*H01M 4/485* (2010.01)
*H01M 4/505* (2010.01)
*H01M 4/525* (2010.01)
*H01M 4/58* (2010.01)
*H01M 4/587* (2010.01)
*H01M 10/0525* (2010.01)
*H01M 10/0564* (2010.01)

(52) U.S. Cl.
CPC ............. *H01M 4/505* (2013.01); *H01M 4/525* (2013.01); *H01M 4/5825* (2013.01); *H01M 4/587* (2013.01); *H01M 10/0525* (2013.01); *H01M 10/0564* (2013.01); *H01M 2300/0025* (2013.01); *H01M 2300/0045* (2013.01); *H01M 2300/0065* (2013.01); *Y02E 60/122* (2013.01); *Y02T 10/7011* (2013.01)
USPC ............................................. 429/306; 556/7

(56) References Cited

FOREIGN PATENT DOCUMENTS

| WO | WO 01/15258 A1 | 3/2001 |
|---|---|---|
| WO | 2007-012174 | 2/2007 |

OTHER PUBLICATIONS

Long, S.; Macfarlane, D.R.; Forsyth, M., Ionic Conduction in Doped Succinonitrile, Solid State Ionics, 2004, 733-738, 175.
Abouimrane, A.; Davidson, I. J., Solid Electrolyte Based on Succinonitrile and LiBOB Interface Stability and Application in Lithium Batteries, Journal of Electrochemical Society, 2007, A1031-A1034, 154.
Supplementary European Search Report on EP 08 748 268 3, Apr. 22, 2010.
International Search Report on PCT/CA2008/000869, Sep. 8, 2008.
Written Opinion on on PCT/CA2008/000869, Sep. 9, 2008.
Abouimrane, A. et al. Journal of Power Sources. 174:883-888 (2007).
Abu-Lebdeh, Y.; Abouimrane, A.; Alarco, P.; Armand, M., Ionic Liquid and Plastic Crystalline Phases of Pyrazolium Imide Salts as Electrolytes for Rechargeable Lithium-Ion Batteries, Journal of Power Sources, 2006, 154:255-261.
Abouimrane, A.; Whitfield, P.S.; Niketic, S.; Davidson, I.J., Investigation of Li Salt Doped Succinonitrile as Potential Solid Electrolytes for Lithium Batteries, Journal of Power Sources, 2007, 174:883-888.
EspaceNet abstract of DE 19829030, Jul. 10, 1999.
Abouimrane, A. et al. Journal of the Electrochemical Society. 151(7):A1028-A1031 (2004).
Hammami, A. et al. Nature. 424:635-636 (2003).
Macfarlane, DR et al. Nature. 402:792-794 (1999).
Long, S. et al. Solid State Ionics. 161:105-112 (2003).
Alarco, P-J. et al. Nature Materials. 3:476-481 (2004).
Cooper, EI. et al. Solid State Ionics. 18/19:570-576 (1986).
Derollez, P. et al. J. Phys.: Condens. Matter. 2:6893-6903 (1990).
Fitzgerald, WE. et al. Journal of Molecular Spectroscopy. 1:49-60 (1957).
Long, S. et al. Solid State Ionics. 175:733-738 (2004).
Alarco, P-J. et al. Solid State Ionics. 172:53-56 (2004).
Abouimrane, A. et al. Journal of Power Sources. 174:1193-1196 (2007).

* cited by examiner

PLASTIC CRYSTAL ELECTROLYTE WITH A BROAD POTENTIAL WINDOW

CROSS-REFERENCE TO RELATED APPLICATIONS

This application is a national entry of International Patent Application PCT/CA2008/000869 filed May 9, 2008 and claims the benefit of U.S. Provisional Patent Application USSN 60/924,387 filed May 11, 2007, the entire contents of both of which are herein incorporated by reference.

FIELD OF THE INVENTION

The present invention relates to plastic crystal electrolytes in lithium-based electrochemical devices.

BACKGROUND OF THE INVENTION

During the last ten years, primary and secondary (rechargeable) lithium batteries have been the object of considerable research and development. The aim is to develop a low cost battery, with a large energy content and good electrical performance. With this in mind, a large number of battery designs have been developed to comply with various applications such as portable products, un-interruptible power supplies (UPS), batteries for zero-emission and hybrid electric vehicles, and automotive start-light-ignition (SLI).

While the focus to date has been on Li-ion batteries that use liquid electrolytes, this technology's basic design creates problems in terms of packaging, format, size, cost, and safety [1]. Ionically conducting solid materials display many advantages over liquids as electrolytes. Polymers offer some advantages in terms of safety and mechanical characteristics over liquid electrolyte systems, and can also be used with lithium metal anodes [2]. Lithium metal anodes provide the highest theoretical capacity density. The mechanical properties of polymer electrolytes decrease problems that might arise from the formation of dendrites that can occur when using lithium metal as the anode. The problem for polymer electrolytes is their low conductivity at room temperature. To overcome this limitation, many approaches have been proposed such as polymer gel electrolytes formed by the introduction of plasticizers or the addition of small molecule additives into the polymer. More recently, plastic crystal electrolytes have been proposed [3, 4, 5, 6]. With conductivities as high as 10-3 S·cm$^{-1}$ at room temperature and good mechanical properties, plastic crystal electrolytes are one of the most promising alternatives to liquid or gelled electrolytes. Furthermore, in comparison to polymer electrolytes, the preparation of a plastic crystal electrolyte is very easy, does not require much addition of a lithium salt, and doesn't need any solvent or radiation cross-linking.

Plastic crystals are mesophases formed mainly by quasi-spherical or disk-like molecules exhibiting rotational and/or orientational disorder while retaining the long-range translational order [7]. A result of this type of "disorder" is the high diffusivity and plasticity that enables plastic crystals to compete with other materials with similar mechanical properties such as polymer electrolytes. The potential of these phases as ion-conducting materials became evident in a publication reporting high ionic conductivities for organic salts based on quaternary ammonium salts [8].

More specifically for lithium battery applications, high ionic conductivities have been reported for plastic crystal phases based on succinonitrile doped with certain lithium salts [5,6]. The plastic crystal properties of neat succinonitrile (abbreviated as SCN) have been characterized in some detail previously [9]. Succinonitrile exhibits plastic crystal formation at temperatures between −40° C. and 58° C. [9]. In the liquid and plastic crystal form, succinonitrile exists in rotational isomers: gauche and trans. However, at temperatures below −44° C. only the gauche form exists [10]. When doped with 5 mol % of lithium bis-trifluoromethanesulphonylimide ($Li(CF_3SO_2)_2N$), the plastic crystal range is reduced to between −34° C. and 49° C. [5]. While doping with 5 mol % of lithium tetrafluoroborate ($LiBF_4$) shifts the plastic crystal phase to between −36° C. and 44° C. [5]. The conductivities of these succinonitrile-lithium salts phases have already been discussed in prior publications [4,5]. Amongst the lithium salts evaluated, $Li(CF_3SO_2)_2N$ and $LiBF_4$ show the highest conductivities with succinonitrile in the crystal plastic form with conductivities above $10^{-3}$ S·cm$^{-1}$ for $Li(CF_3SO_2)_2N$ and $10^{-4}$ S·cm$^{-1}$ for $LiBF_4$ at room temperature [5]. These conductivities are good enough to use these electrolytes in lithium batteries at room temperature. $Li(CF_3SO_2)_2N$-succinonitrile electrolytes have already been demonstrated and quite good electrochemical performances have been obtained using $Li(CF_3SO_2)_2N$-succinonitrile with a $Li_4Ti_5O_{12}$ anode and either $LiFePO_4$ or $LiCoO_2$ as the cathode material [6]. However, for theses batteries, the voltage output is only about 2 V, and consequently, they can not deliver high energy densities.

Canadian patent application 2,435,218 [12] discloses the use of lithium titanate anodes in electrochemical cells comprising a succinonitrile (NC—$CH_2$—$CH_2$—CN) plastic crystal electrolyte. However, the electrochemical potential of lithium titanate is weak (−1.5 V vs. standard hydrogen electrode) compared to the electrochemical potential of lithium metal (−3.045 V vs. standard hydrogen electrode), therefore electrochemical cells based on lithium titanate are incapable of delivering high energy density. For electrochemical cells incorporating succinonitrile, it was believed that lithium metal, and therefore materials having an electrochemical potential similar to lithium metal, could not be used as the anode due to the possibility of reactivity between —CN group and lithium metal [5], resulting in polymerization of the succinonitrile.

International patent publication WO 2007-012174 discloses that lithium-based anodes having a potential within about 1.3 V of lithium metal may be used with succinonitrile-based plastic crystal electrolytes. While electrochemical devices based on such systems are capable of delivering high energy densities, it would be desirable to deliver high energy densities over a broader potential window, thereby allowing the use of a greater variety of cathodes. International patent publication WO 2007-012174 discloses the use of $LiBF_4$ and $(Li(CF_3SO_2)_2N$ in succinonitrile-based plastic crystal electrolytes for electrochemical devices that are stable up to a potential difference with respect to $Li^+/Li^0$ of 3.9 V and 4.5 V, respectively.

There remains a need in the art for improved electrochemical devices that enjoy the benefits of a solid ionic electrolyte while being stable over a broader potential window.

SUMMARY OF THE INVENTION

It has now been found that the use of lithium bioxalato borate salt ($Li[C_2O_4]_2B$) (abbreviated as LiBOB) in a solid ionic electrolyte having an organic plastic crystal matrix, especially a neutral organic plastic crystal matrix, provides a stable electrolyte interface over a broader potential window.

According to one aspect of the invention, there is provided an electrolyte comprising an organic plastic crystal matrix doped with lithium bioxalato borate salt.

According to another aspect of the invention, there is provided a use of a solid ionic electrolyte having an organic plastic crystal matrix doped with lithium bioxalato borate salt in an electrochemical device.

According to yet another aspect of the invention, an electrochemical device is provided comprising: a solid ionic electrolyte having an organic plastic crystal matrix doped with lithium bioxalato borate salt; an anode; and, a cathode.

Advantageously, electrochemical devices of the present invention have a window of electrochemical stability of about 4.6 V or greater, preferably 4.75 V or greater, more preferably 5 V or greater. Further, the use of LiBOB as opposed to $Li(CF_3SO_2)_2N$ (LiTFSI) and the like results in smaller initial AC impedance increase and a shorter stabilization time. LiTFSI-based systems require 4-7 days to stabilize, while systems based on LiBOB stabilize in less than 3 days, even less than 2 days, for example within 24 hours. The LiBOB-based solid electrolyte shows good thermal stability, high ionic conductivity, a wide electrochemical stability window and good compatibility with lithium metal.

Electrochemical devices of the present invention also have a large voltage differential between the anode and cathode leading to the delivery of higher energy density, while maintaining the advantages of the organic plastic crystal matrix, for example, its neutrality when it is a neutral organic plastic crystal matrix, its high diffusivity, its excellent chemical stability, its excellent mechanical properties, its excellent range of plasticity (e.g. −35° C. to 60° C. for succinonitrile), relative non-flammability and its non-corrosiveness.

Preferred are neutral organic plastic crystals that exhibit high polarity, which imparts excellent solvating ability for lithium salts, and due to the neutrality of the matrix, also have a high lithium ion transference number. The advantage of a highly polar, neutral organic plastic crystal is its excellent lithium ion conductivity at room temperature when doped with lithium bioxalato borate salt.

The anode preferably has a potential within about 2 V of lithium metal, more preferably within about 1.6 V of lithium metal, for example within about 1.5 V of lithium metal. The anode preferably comprises a Li-containing material, for example lithium metal, a lithium alloy, lithium intercalated into hard or soft carbon (e.g. lithium intercalated into graphite), lithium intercalated into an oxide, a nitride or a phosphide, lithium inserted into a compound or composite by displacement, or a mixture thereof. Compounds and composites in which lithium may be inserted may comprise, for example, Sn compounds, Sb compounds, Al compounds, transition metal oxides, transition metal nitrides or transition metal phosphides (e.g. $Cu_2Sb$, $CoSb_3$, $SnFe_2$, $Sn_5Cu_6$, $Mn_2Sb$, tin oxide, silicon oxide, cobalt oxide, iron oxide, titanium oxide, copper oxide, $Cu_3P$, $FeP_2$, FeP, $NiP_2$, $NiP_3$, and $Li_{2.6}Co_{0.4}N$). Alloys of lithium may comprise, for example, lithium alloyed with Si, Sb, Al, Bi, Sn and/or Ag. Anode materials may be used alone or in combination with other materials. For example, lithium alloys may be used alone or in combination with carbon and/or other metals (e.g. Ni, Mn, Cr, Cu, Co). In one embodiment, anode materials may comprise a lithium titanate, for example $Li_4Ti_5O_{12}$. A particular advantage of the present invention is that anodes comprising lithium intercalated into carbon (e.g. graphite) may be successfully used in electrochemical devices at higher operating voltages.

The solid ionic electrolyte has an organic plastic crystal matrix, preferably a neutral organic plastic crystal matrix. A non-neutral organic plastic crystal matrix may comprise, for example, a pyrazolium imide [17] or a crown ether:salt complex (e.g. (18-Crown-6)-LiTFSI [18]). A neutral organic plastic crystal matrix may comprise, for example, succinonitile. Neutral organic plastic crystal matrices are non-ionic and uncharged. The organic plastic crystal matrix is doped with LiBOB. LiBOB may be incorporated into the organic plastic crystal matrix in any suitable amount, for example, in an amount of about 5 mol % or less, more preferably in an amount of from about 0.1-5 mol % or from about 0.1-4.5 mol %. The solubility of LiBOB in the organic plastic crystal matrix may limit the amount of LiBOB that can be used. During discharge or charge of the electrochemical device, the solid ionic electrolyte ensures transport of ionic species from one electrode to the other, even inside a composite electrode.

One or more other dopants comprising an ionic salt may also be present in the organic plastic matrix, for example another lithium salt. When present, the other dopant is preferably a lithium salt of a fluorinated compound, more preferably a lithium salt of a fluorinated sulphonylimide. Some examples of suitable other dopants are lithium bis-trifluoromethanesulphonylimide $(Li(CF_3SO_2)_2N)$ sometimes abbreviated as LiTFSI, lithium bis-perfluoroethylsulphonylimide $(Li(C_2F_5SO_2)_2N)$, lithium difluoro(oxalato)borate $(LiC_2O_4BF_2)$ sometimes abbreviated as LiODFB, lithium tetrafluoroborate $(LiBF_4)$, lithium hexafluorophosphate $(LiPF_6)$, lithium thiocyanate (LiSCN), lithium triflate $(LiCF_3SO_3)$, lithium tetrafluoroaluminate $(LiAlF_4)$, lithium perchlorate $(LiClO_4)$ and mixtures thereof. When present, the other dopant is preferably $Li(CF_3SO_2)_2N$ or $LiBF_4$. The other dopant may be incorporated into the neutral organic plastic crystal matrix in any suitable amount, for example, in an amount of from 1-20 mol %, more preferably in an amount of from 2-17 mol % or from 2-15 mol % or from 2-12 mol %.

The cathode may be any material suitable for use as a counter-electrode in an electrochemical device where the electrolyte is an organic plastic crystal matrix doped with an ionic salt. The cathode may comprise an insertion compound comprising lithium ions reversibly or non-reversibly inserted into an atomic framework. The atomic framework may comprise, for example, a single metal oxide, a mixed metal oxide, a single metal phosphate, a mixed metal phosphate, a single metal vanadate or a mixed metal vanadate. The metal is preferably one or more first row transition metals. Examples of suitable cathode materials include $LiCoO_2$, $Li(Ni,Co)O_2$, $LiMn_2O_4$, $Li(Mn_{0.5}Ni_{0.5})O_2$, $Li_{1+x}(Mn,Ni)_{1-x}O_2$, $Li_{1+x}(Mn,Ni,Co)_{1-x}O_2$, $LiNi_{0.5}Mn_{1.5}O_4$, $LiFePO_4$ and $V_2O_5$.

Organic plastic crystal electrolytes, particularly those formed from a neutral organic plastic matrix (e.g. succinonitrile) and LiBOB, can replace polymer and liquid electrolytes in electrochemical devices comprising Li-containing anodes and/or cathodes. Such electrochemical devices may have operating voltages as high as about 5 volts, for example in a range of from about 0-5 volts, or about 0.5-4.6 volts, or about 2.5-4.6 volts, or about 2.5-3.9 volts. Such electrochemical devices include, for example, electrochemical cells (e.g. batteries), fuel cells, electrochromic devices, supercapacitors and chemical sensors. The present invention is particularly well suited to commercial lithium battery applications such as rechargeable batteries for portable electronics and electric vehicles, hybrid electric vehicles or plug-in hybrid electric vehicles.

BRIEF DESCRIPTION OF THE DRAWINGS

In order that the invention may be more clearly understood, embodiments thereof will now be described in detail by way of example, with reference to the accompanying drawings, in which.

DETAILED DESCRIPTION OF THE INVENTION

Preparation of Succinonitrile Crystal Plastic Electrolytes Doped with LiBOB

The preparation of a succinonitrile crystal plastic electrolyte as a free-standing thin film is not practical due to moisture sensitivity of the lithium bioxalato borate (LiBOB) component in ambient air. Consequently, all preparation and handling was performed inside an Argon-filled glove box. LiBOB-doped succinonitrile is heated until melting and then spread as a viscous liquid on to a cathode and a porous separator.

For the preparation of cathode discs, a slurry was formed by mixing the active material (LiFePO$_4$ or Li$_{1.2}$Mn$_{0.4}$Ni$_{0.3}$Co$_{0.1}$O$_2$ (LMNCO)) (84 wt %), Super S carbon black (4 wt %), graphite (4 wt %), and binder (8 wt %) from a solution of polyvinylidene fluoride (Kynarflex™ 2800) dissolved in N-methyl-2-pyrrolidinone. The slurry was coated onto an aluminum current collector. The cathodes were dried under vacuum at 110° C. overnight and then discs of 14.2 mm diameter were punched and weighed. The weight of active material in the electrode sheet was about 5 mg cm$^{-2}$.

Electrochemical performances of solid electrolytes were investigated in two-electrode coin cells (size 2325), with lithium foil or graphitic (MCMB) carbon as the negative electrodes, assembled in a glove box filled with argon. Cell tests were conducted at 40° C. or ambient (20° C.) temperature by galvanostatic cycling on an Arbin battery cycler. Cyclic voltammetry was performed at 40° C. or ambient temperature (20° C.) in the voltage range of –0.5 V to 6 V at scan rates of 5 mV s$^{-1}$ or 10 mV s$^{-1}$ on a Princeton Applied Research potentiostat/galvanostat (Parstat™ 2263) with the electrolyte sandwiched between lithium and stainless steel (SS) electrodes. Electrochemical impedance measurements were carried out at 40° C. or ambient temperature (20° C.) by applying 2 MHz to 0.01 Hz frequency ranges with oscillation amplitude of 10 mV using a Princeton Applied Research potentiostat/galvanostat (Parstat™ 2263). Thermal data were obtained with a differential scanning calorimeter (DSC) module [TA Instruments 2920] at a heating rate of 10° C./min in nitrogen atmosphere.

Example 1

Differential Scanning Calorimetry (DSC)

Succinonitrile exists in the plastic crystal phase between –44° C. and 55° C. [9] and exhibits a body centered crystal structure. In this phase the molecules exist in two isometric conformations; a gauche and a trans isomer [9]. LiBOB is a relatively new lithium battery electrolyte salt [15] characterized by its higher thermal stability and ability to form good solid electrolyte interface (SEI) with lithium. However, LiBOB has lower solubility in organic solvents.

Figure 1:
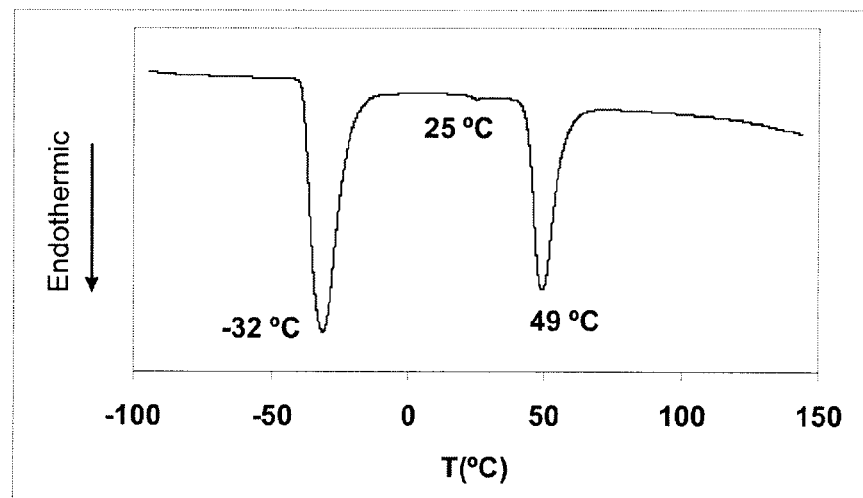
FIG. 1 is a graph depicting a DSC scan of 4 mol % LiBOB-doped succinonitrile at a heating rate of 10° C./minute.

For differential scanning calorimetry (DSC) studies, a hermetically sealed pan is slowly cooled to –100° C. and then heated to 150° C. at a scan rate of 10° C./min. FIG. 1 shows the DSC profile for the 4 mol % LiBOB-doped succinonitrile. The first endothermic peak at –32° C. shows the transformation from the rigid solid state to a plastic crystalline state. The second strong endothermic peak at 49° C. indicates the melting point. A weak endothermic peak at 25° C. may be due to the presence of a eutectic like SCN—LiBF$_4$ (or SCN—LiTFSI) system [16].

Example 2:

Conductivity

Figure 2:
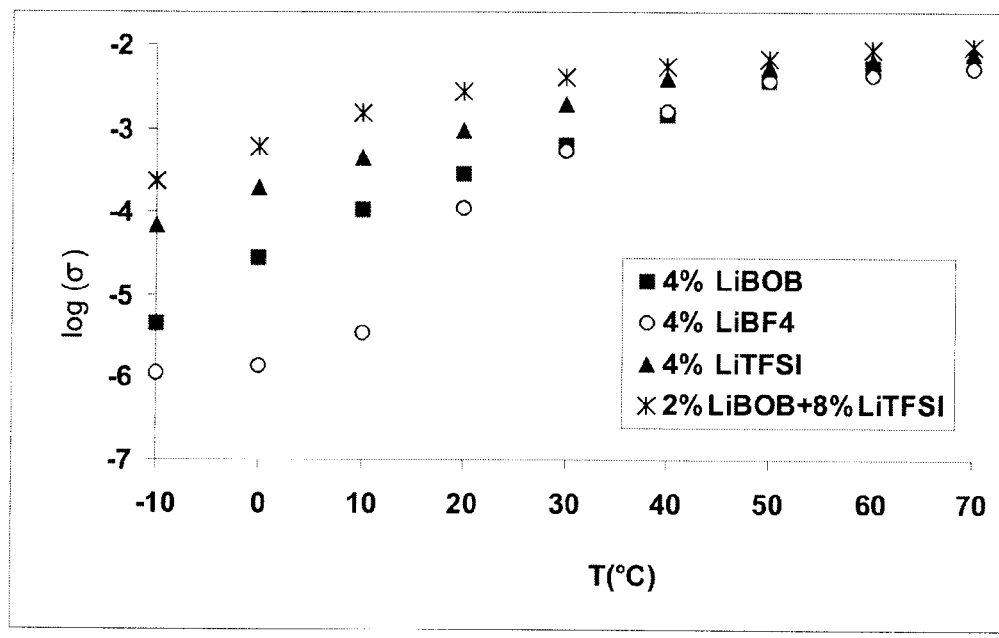
FIG. 2 is a graph depicting variation in log of conductivity (S/cm) as a function of temperature (° C.) for compositions of 4 mol % LiBOB, 4 mol % LiBF$_4$, 4 mol % LiTFSI, and 2 mol % LiBOB+8 mol % LiTFSI in succinonitrile.

Temperature dependency of the conductivity of 4 mol % LiBOB-doped succinonitrile is shown in FIG. 2 in comparison to 4 mol % LiBF$_4$-doped succinonitrile and 4 mol % LiTFSI-doped succinonitrile. Room temperature conductivity for LiBOB-doped succinonitrile is greater than $10^{-4}$ S/cm and at 40° C. reaches $1.4 \times 10^{-3}$ S/cm, good enough for practical use in lithium cells. The conductivity of LiBOB-doped succinonitrile is between those for $LiBF_4$-doped succinonitrile and LiTFSI-doped succinonitrile. Combination of 2 mol % LiBOB and 8 mol % LiTFSI provides conductivity substantially greater than that of 4% LiTFSI and exceeds $10^{-3}$ S/cm at temperatures as low as 10° C.

Example 3

Electrochemistry Impedance Spectroscopy (EIS)

Figure 3A:
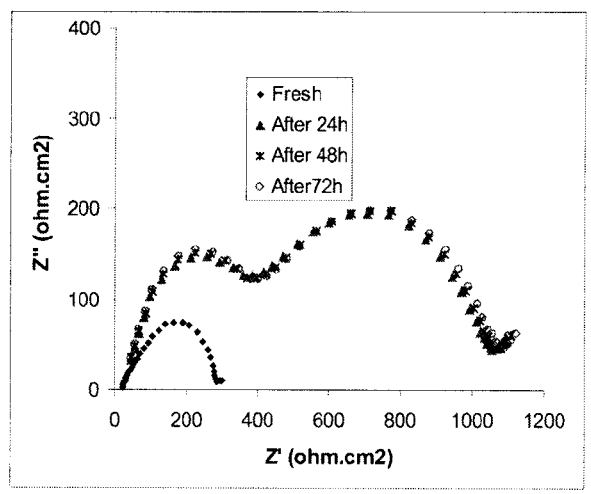
FIG. 3a is a graph depicting time evolution of impedance response of a Li/SCN-4% LiBOB/Li cell at 40° C.
Figure 3B:
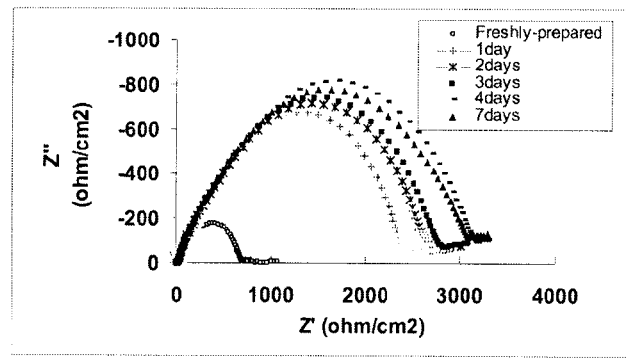
FIG. 3b is a graph depicting time evolution of impedance response of a Li/SCN-4% LiTFSI/Li cell at room temperature.

Electrochemistry impedance spectroscopy (EIS) analysis was used to investigate the effect on conductivity of the interface reaction at the lithium-electrolyte interface for the solid electrolyte. It may be represented by a typical Nyquist plot obtained by electrochemical impedance spectroscopy measurements. Time evolution of the impedance response was monitored for a Li/SCN-4% LiBOB/Li cell at open circuit for 72 hours. The low frequency semicircle in the EIS spectra of Li/SCN -4% LiBOB/Li is attributed to the bulk resistance of the electrolyte. The response plotted in FIG. 3a shows that after 24 hours a small expansion occurs in the first semicircle and the formation of a second semicircle is observed. The small expansion of the first semi-circle may be due to a corrosion reaction between the lithium metal and the electrolyte and is minimized by the formation of a solid electrolyte interface (second semi-circle). In measurements taken after 48 hours and 72 hours, the impedance responses are very similar to the response after 24 hour. This indicates that the solid electrolyte interface (SEI) is formed within 24 hours and is quite stable thereafter. For comparison, FIG. 3b depicts a similar plot for the time dependence of evolution of impedance spectrum of a Li/SCN-4% LiTFSI/Li cell. It is evident from FIG. 3b that stability of the SCN-LTFSI system does not occur for at least 4 days and that the initial impedance increase is greater for the SCN—LiTFSI system than for the SCN—LiBOB system. The SCN—LiBOB system will therefore provide higher power output at a given current.

Figure 3C:
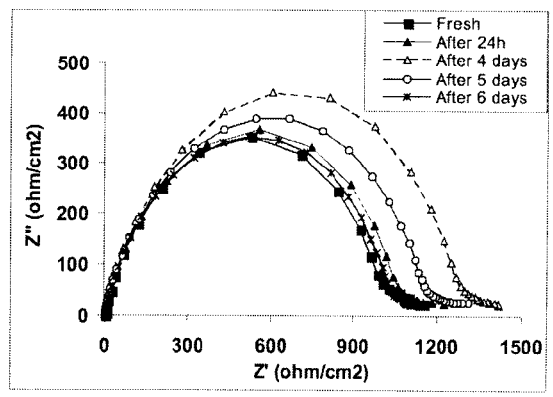
FIG. 3c is a graph depicting time evolution of impedance response of a Li/SCN-2% LiBOB+8% LiTFSI/Li cell at room temperature.

FIG. 3c depicts a plot of the time dependence of evolution of impedance spectrum of a Li/SCN-2% LiBOB+8% LiTFSI/Li cell. The impedance increases during the first 4 days and then reduces over the subsequent 2 days to levels near that of the fresh cell. Thereafter the impedance spectrum indicates a similar internal resistance to that of SCN-4% LiBOB. The combination of 2% LiBOB with 8% LiTFSI imparts the combined benefits of low internal resistance with high room temperature conductivity.

Example 4

Cyclic Voltammetry

Figure 4A:
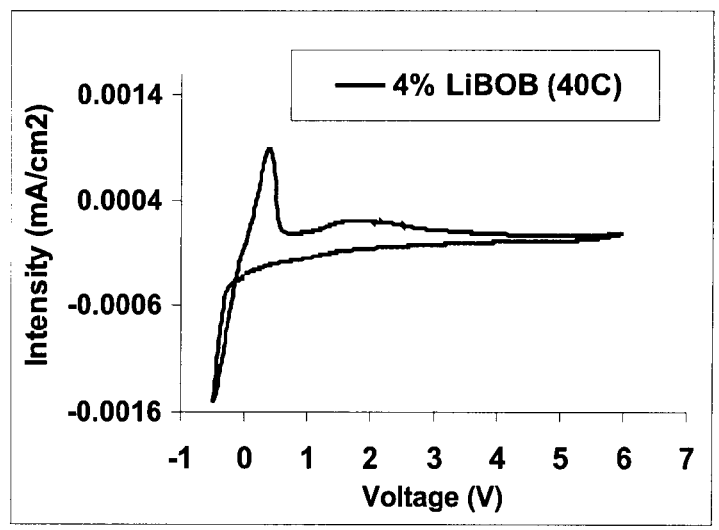
FIG. 4a is a graph depicting cyclic voltammograms obtained at 40° C. of SCN-4% LiBOB electrolyte using metallic lithium as blocking electrode and stainless steel as working electrode at scan rate of 10 mV·S$^{-1}$.
Figure 4B:
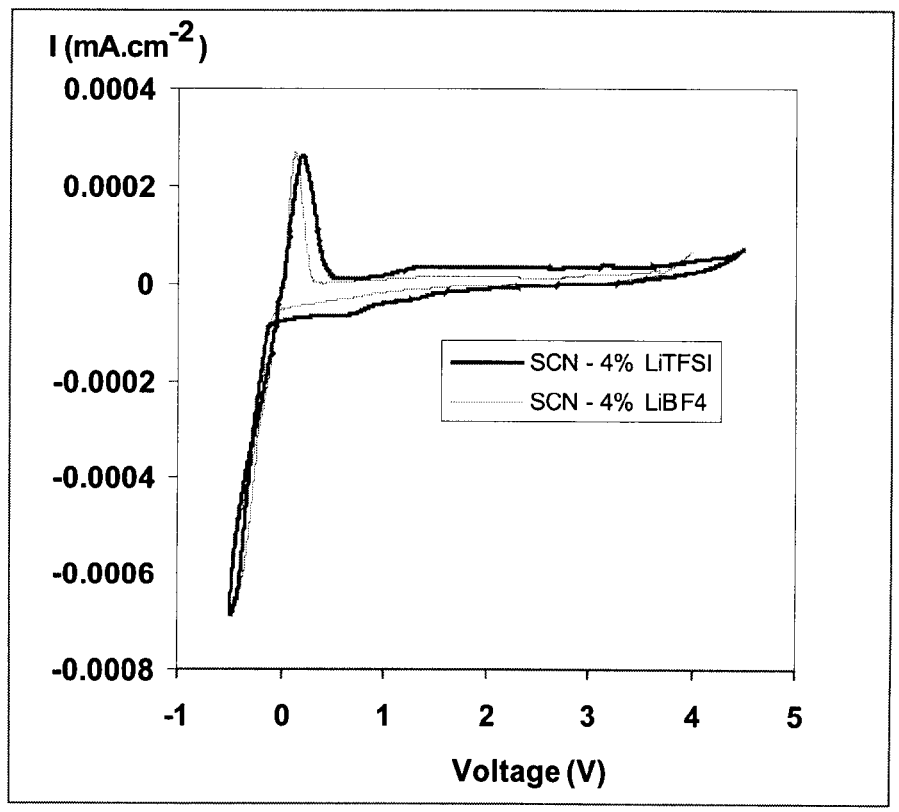
FIG. 4b is a graph depicting cyclic voltammograms obtained at room temperature of SCN-4% LiTFSI and SCN-4% LiBF$_4$ electrolytes using metallic lithium as blocking electrode and stainless steel as working electrode at scan rate of 5 mV·S$^{-1}$.

Referring to FIG. 4a, electrochemical stability window of the SCN-4% LiBOB electrolyte was measured by cyclic voltammetry at 40° C. with a scan rate of 10 mV/s in an electrochemical cell. A stainless steel working electrode was separated from a lithium metal disk that served as both the reference and counter electrodes by a sheet of micro-porous separator Celgard™ 3501 impregnated with the electrolyte. At 40° C., after lithium stripping at 0.36 V and lithium deposition at −0.48 V, no onset voltage was observed for anodic and cathodic currents even at 6 V versus Li/Li$^+$. This indicates that this electrolyte has a good electrochemical stability for use in lithium secondary cells with high voltage cathodes such as the layered $Li_{1+x}Mn_{0.4}Ni_{0.4-y}Co_yO_2$ oxides. For comparison, FIG. 4b depicts cyclic voltammograms of SCN-4% LiTFSI and SCN-4% $LiBF_4$, in which onset voltages for irreversible oxidation were observed at about 4.5 V and 3.9 V, respectively. These results illustrate that the SCN—LiBOB system has a broader window of electrochemical stability than related prior art systems.

Example 5

Electrochemical Performance

Figure 5:
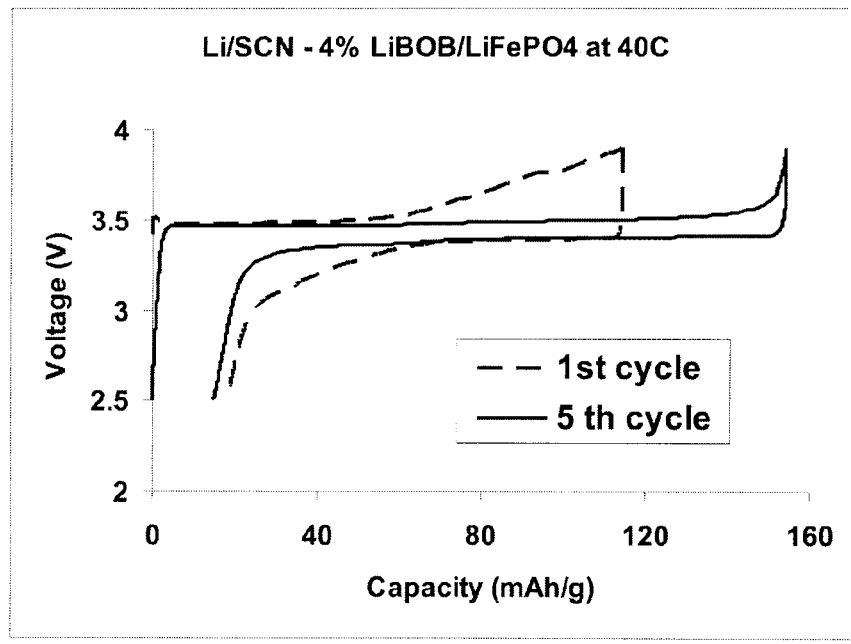
FIG. 5 is a graph depicting first and fifth galvanostatic (C/12 rate) charge-discharge cycles of a Li/SCN-4% LiBOB/LiFePO$_4$ cell cycled at 40° C.
Figure 6:
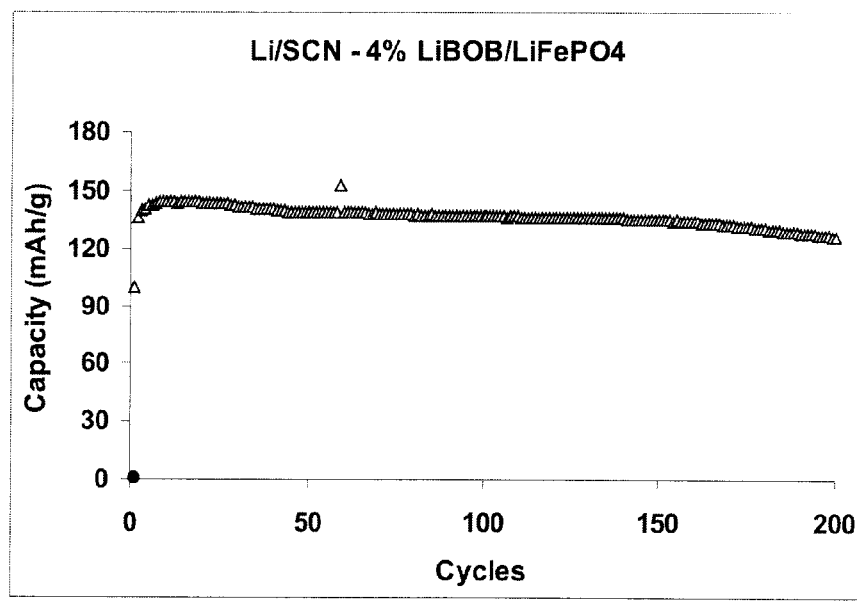
FIG. 6 is a graph depicting specific charge-discharge capacity vs. cycle number of a Li/SCN-4% LiBOB/LiFePO$_4$ cell cycled at C/12 rate at 40° C.

In order to evaluate the electrochemical performance of this lithium plastic crystal electrolyte, test cells were constructed using the 4% LiBOB-succinonitrile electrolyte, a lithium metal anode and a $LiFePO_4$ cathode and were cycled at 40° C. FIG. 5 presents the variations of voltage versus charge/discharge capacity at the 1st and the 5th cycle for a Li/SCN-4% LiBOB/$LiFePO_4$ cell. For these tests, the voltage range was 2.5-3.9 V versus Li/Li$^+$ and the current density was C/12 (14.2 mA.g$^{-1}$). A voltage plateau near 3.5 V was observed. The initial cycle showed a large ohmic resistance and low capacity, but on cycling, the ohmic resistance between the anode and the cathode decreased (FIG. 5). The total discharge capacity increased from only 97 mAh.g$^{-1}$ at the first cycle to 141 mAh.g$^{-1}$ by the 5th cycle. The evolution of capacity during cycling in the potential range of 2.5-3.9 V at C/12 rate is presented in FIG. 6. The cycle performance was excellent, even after 200 cycles the discharge capacity is still very high at 126 mAh.g$^{-1}$.

Figure 7A:
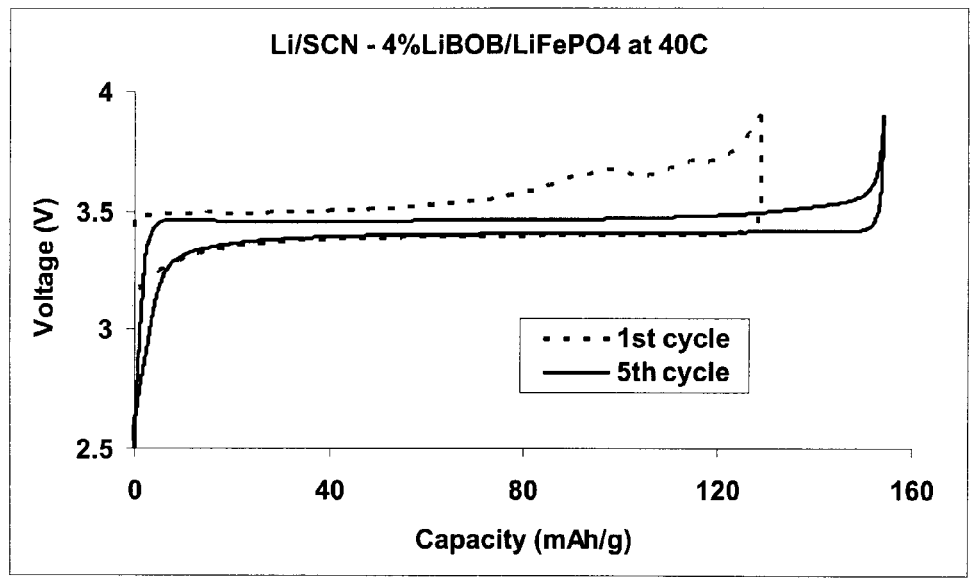
FIG. 7a is a graph depicting first and fifth galvanostatic (C/24 rate) charge-discharge cycles of a Li/SCN-4% LiBOB/LiFePO$_4$ cell cycled at 40° C.
Figure 7B:
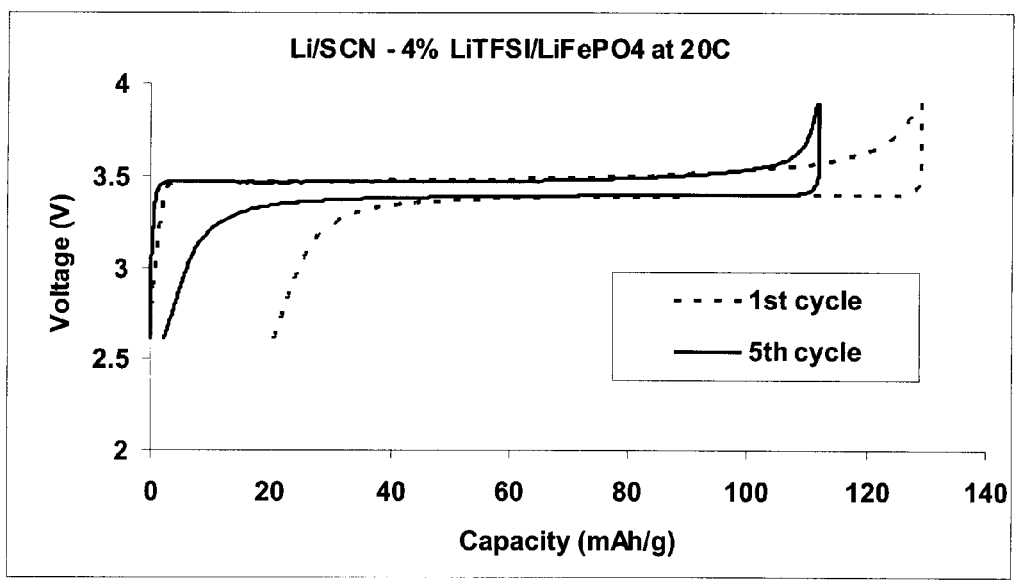
FIG. 7b is a graph depicting first and fifth galvanostatic (C/24 rate) charge-discharge cycles of a Li/SCN-4% LiTFSI/LiFePO$_4$ cell cycled at 20° C.
Figure 7C:
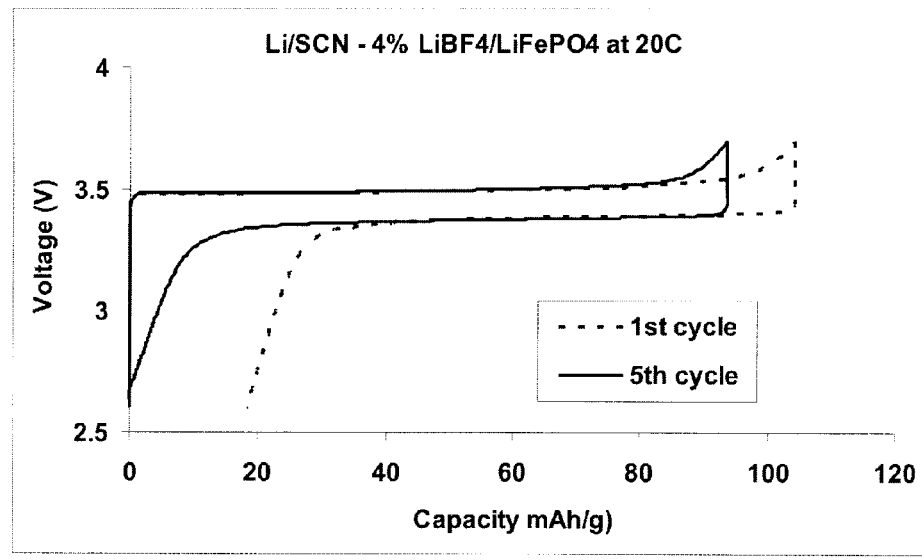
FIG. 7c is a graph depicting first and fifth galvanostatic (C/24 rate) charge-discharge cycles of a Li/SCN-4% LiBF$_4$/LiFePO$_4$ cell cycled at 20° C.
Figure 7D:
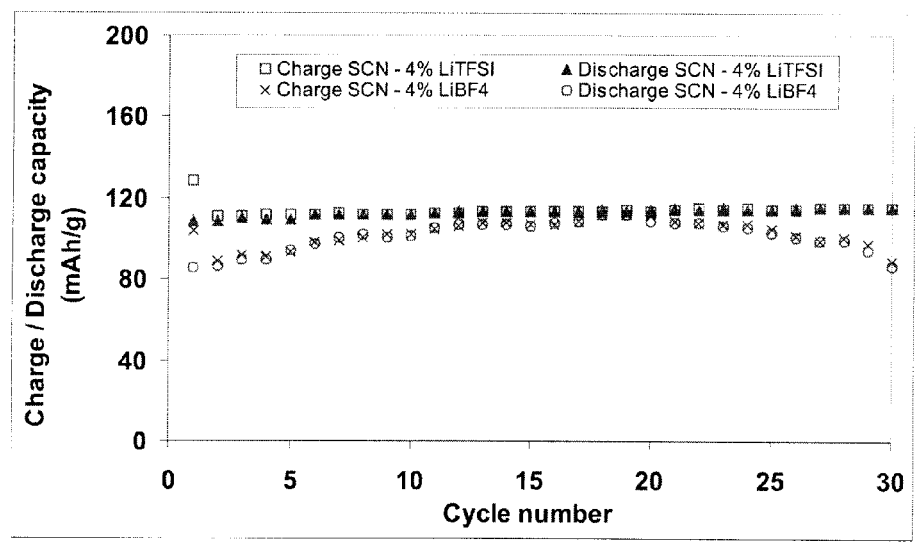
FIG. 7d is a graph depicting specific charge-discharge capacity vs. cycle number of Li/SCN-4% LiTFSI/LiFePO$_4$ and Li/SCN-4% LiBF$_4$/LiFePO$_4$ cells cycled at C/24 rate at room temperature.

For comparison, FIGS. 7a, 7b and 7c depict first and fifth galvanostatic charge-discharge cycles at C/24 rate of a Li/SCN-4% LiBOB/$LiFePO_4$ cell cycled at 40° C., a Li/SCN-4% LiTFSI/$LiFePO_4$ cell cycled at 20° C. and a Li/SCN-4% $LiBF_4$/$LiFePO_4$ cell cycled at 20° C., respectively. It is evident from FIGS. 7a-7c that the SCN—LiBOB has both a higher capacity and better capacity retention than the other two. Further, in comparing FIG. 7d to FIG. 6, it is evident that for cells with the same anode and cathode, the capacity is greater with SCN—LiBOB electrolyte than either of the other two electrolytes investigated, even when the SCN—LiBOB system is cycled at twice the cycling rate of the other two.

Figure 8:
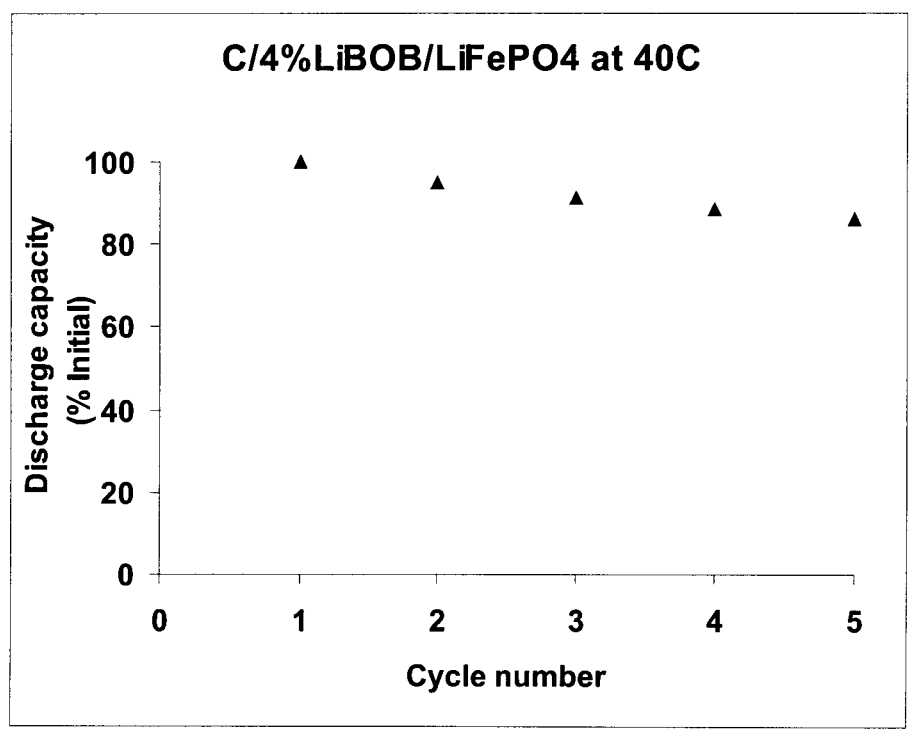
FIG. 8 is a graph depicting discharge capacity retention (as a function of initial capacity) of a lithium-ion cell with a carbon anode, SCN-4% LiBOB electrolyte and a LiFePO$_4$ cathode cycled at 40° C. at C/24 rate.

The electrochemical performance in a lithium ion cell with a carbon anode, SCN-4% LiBOB electrolyte and a $LiFePO_4$ cathode was investigated in a cell cycled at 40° C. The discharge capacity retention, depicted in FIG. 8 as a percentage of the initial capacity, demonstrates the utility of SCN—LiBOB solid plastic crystal electrolyte in lithium ion cells.

Figure 9:
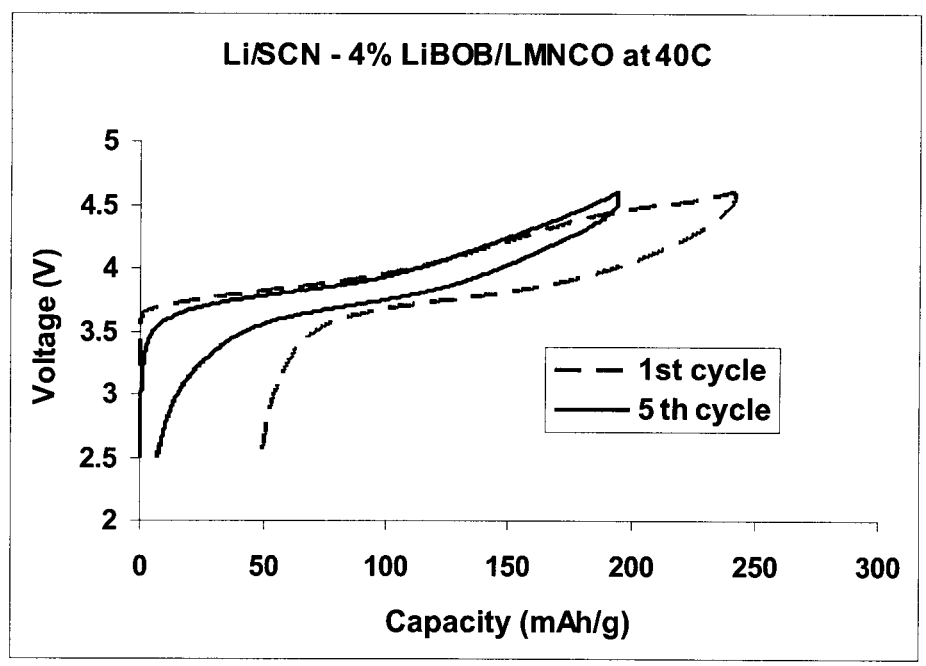
FIG. 9 is a graph depicting first and fifth galvanostatic (C/12 rate) charge-discharge cycles of a Li/SCN-4% LiBOB/Li$_{1.2}$Mn$_{0.4}$M$_{0.3}$Co$_{0.1}$O$_2$ (LMNCO) cell cycled at 40° C.
Figure 10:
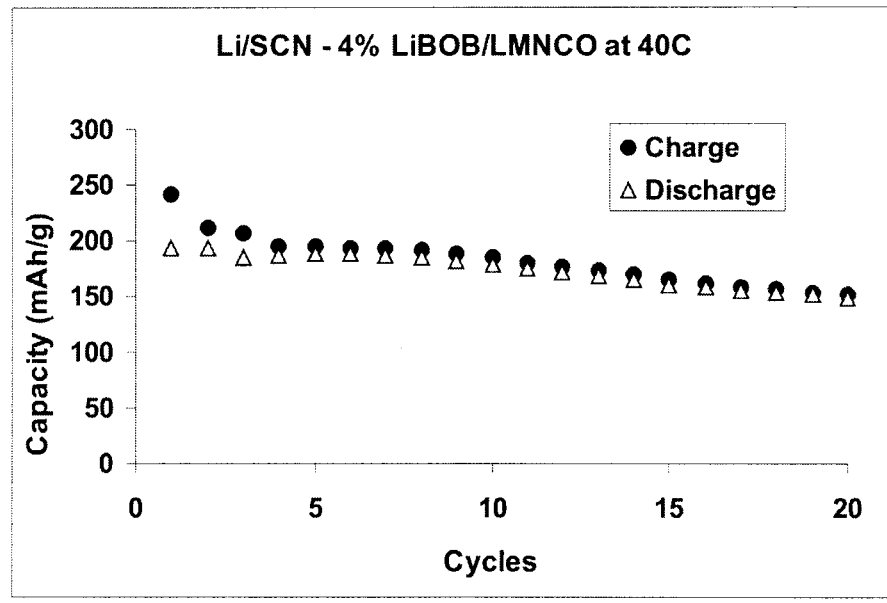
FIG. 10 is a graph depicting specific charge-discharge capacity vs. cycle number of a Li/SCN-4% LiBOB/Li$_{1.2}$Mn$_{0.4}$Ni$_{0.3}$Co$_{0.1}$O$_2$ (LMNCO) cell cycled at C/12 rate at 40° C.

The electrochemical performance of lithium half cells having SCN-4% LiBOB solid electrolyte and a $Li_{1.2}Mn_{0.4}Ni_{0.3}Co_{0.1}O_2$ cathode was also investigated. FIG. 9 compares the initial and the 5th cycle charge-discharge capacities for a Li/SCN-4% LiBOB/$Li_{1.2}Mn_{0.4}Ni_{0.3}Co_{0.1}O_2$ cell cycled between 2.5 and 4.6 V at C/12 rate (with C=240 mAh.g$^{-1}$). The cell has a higher charge capacity (~240 mAh.g$^{-1}$) and also a higher discharge capacity (193 mAh.g$^{-1}$) than the previous cell with a $LiFePO_4$ cathode (FIG. 5). A low coulombic efficiency in the first few cycles is characteristic of the $Li_{1.2}Mn_{0.4}Ni_{0.3}Co_{0.1}O_2$ system and is due to an irreversible process that involves removal of lithium and oxygen from the material. However, as shown in FIG. 10, the coulombic efficiency improves after a few cycles to near 99%.

Example 6

Electrolyte Doped with LiBOB and LiTFSI

To increase ionic conductivity of the electrolyte at room temperature, a mixture of 8 mol % LiTFSI and 2 mol %

Figure 11:
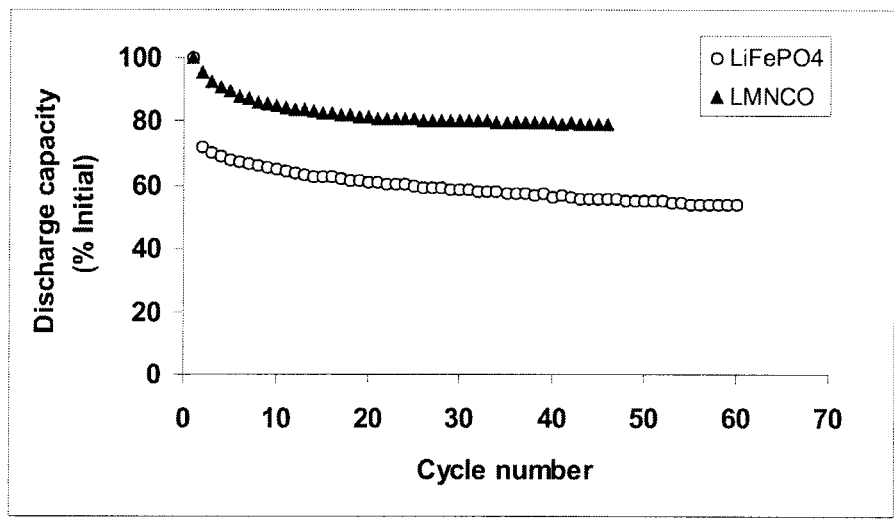
FIG. 11 is a graph depicting discharge capacity retention (as a percent of initial capacity) of lithium-ion cells with carbon anodes, SCN-2% LiBOB+8% LiTFSI electrolyte with either LiFePO$_4$ or Li$_{1.2}$Mn$_{0.4}$Ni$_{0.3}$Co$_{0.1}$O$_2$ (LMNCO) cathodes cycled at ambient temperature (20° C.) at C/24 rate.

LiBOB was employed. Cycle performance of carbon/LiFePO$_4$ and carbon/Li$_{1.2}$Mn$_{0.4}$Ni$_{0.3}$Co$_{0.1}$O$_2$ cells with the SCN-2% LiBOB+8% LiTFSI solid electrolyte is shown in FIG. 11. Modest capacity fading is observed for the cell with the LiFePO$_4$ cathode, particularly in the early cycles, but after 20 cycles more than 81% of the initial discharge capacity is retained. For the lithium ion cell with the Li$_{1.2}$Mn$_{0.4}$Ni$_{0.3}$Co$_{0.1}$O$_2$ cathode, the discharge capacity drops about 25% on the first cycle due to formation reactions that occur on the first cycle, and thereafter very good capacity retention is observed.

Figure 12:
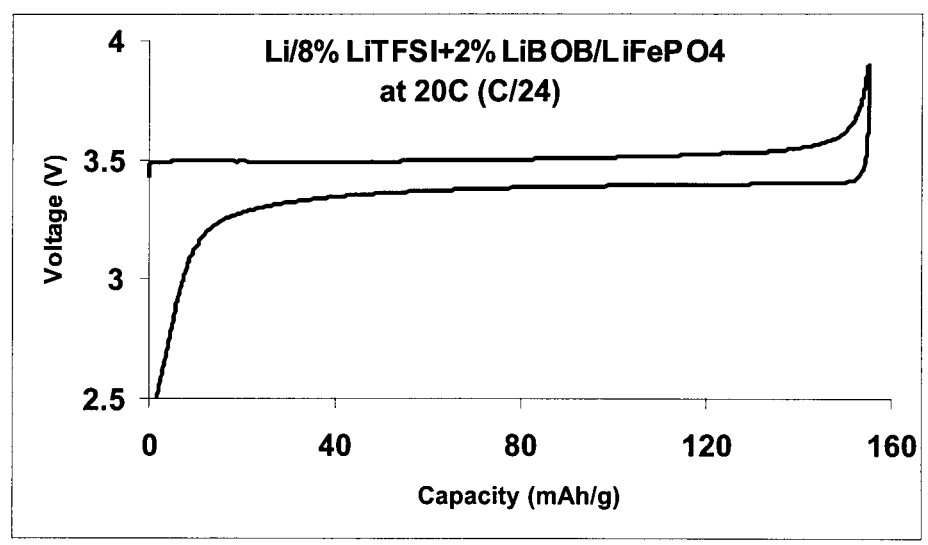
FIG. 12 is a graph depicting first galvanostatic (C/24 rate) charge-discharge cycle of a Li/SCN-2% LiBOB+8% LiTFSI/LiFePO$_4$ cell cycled at 20° C.

Electrochemical evaluations of SCN-4% LiBOB and of SCN -2% LiBOB+8% LiTFSI electrolytes were also conducted with metallic lithium and lithium titanate anodes. The first cycle charge-discharge of a Li/SCN -2% LiBOB+8% LiTFSI/LiFePO$_4$ cell cycled at 20° C., shown in FIG. 12, indicates an excellent capacity of 153 mAh/g.

References:
1. A. Hammami, N. Raymond, and M. Armand, *Nature*, 424, 635 (2003).
2. Armand M. B. 'Fast Ion Transport in Solids', ed W. Van Gool, North Holland, Amsterdam, p 0.665 (1973).
3. D. MacFarlane, J. Huang and M. Forsyth, *Nature*, 402, 792 (1999).
4. S. Long, D. R. MacFarlane, M. Forsyth, *Solid State Ionics*, 161, 105 (2003).
5. P. J. Alarco, Y. Abu-Lebdeh, A. Abouimrane, M. Armand, *Nature Materials*, 3, 476 (2004).
6. A. Abouimrane, Y. Abu-Lebdeh, P. J. Alarco and Michel Armand, *J. Electrochem. Soc.*, 151 (7), A1028 (2004).
7. J. N. Sherwood, The Plastically Crystalline State, Wiley, London, (1979).
8. I. E. Cooper and C. Angell, *Solid State Ionics*, 18-19, 570 (1986).
9. P. Derollez, J. Lefebvre, M Descamps, W. Press and H. Fontaine, *J. Phys. Condens. Matter*, 2(33), 6893-903 (1990).
10. E. Fitzgerald and J. Jantz, *J. Mol. Spectroscop.*, 1, 49 (1957).
11. S. Long, D. R. MacFarlane, M. Forsyth, *Solid State Ionics*, 175, 733 (2004).
12. CA 2,435,218, Y. Abu-Lebdeh et al., Jan. 28, 2005.
13. WO 0115258, D. R. MacFarlane et al., Mar. 1, 2001.
14. WO 2007012174, A. Abouimrane et al., Feb. 1, 2007.
15. DE 19829030, U. Lischka et al., 1999.
16. A. Abouimrane, P. S. Whitfield, S, Niketic and I. J. Davidson. *J. Power Sources*, 174(2), 883-888 (6 Dec. 2007).
17. P-J. Alarco, Y. Abu-Lebdeh, N. Ravet and M. Armand. *Solid State Ionics*, 172, 53-56 (2004).
18. A. Abouimrane, P-J. Alarco, Y. Abu-Lebdeh, I. Davidson and M. Armand. *J. Power Sources*, 174, 1193-1196 (2007).

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. Electrolyte comprising an organic plastic crystal matrix comprising succinonitrile doped with 0.1-4.5 mol% lithium bioxalato borate salt, the electrolyte providing a window of electrochemical stability of 4.6 V or greater, stabilizing in less than 3 days and having a conductivity of $10^{-4}$ S/cm or greater.

2. The electrolyte according to claim 1, further comprising one or more other dopants.

3. The electrolyte according to claim 2, wherein the one or more other dopants are present in an amount of 1-20 mol%.

4. An electrochemical device comprising a solid ionic electrolyte as defined in claim 1, an anode and a cathode.

5. The device according to claim 4, wherein the anode comprises a Li-containing material having an electrochemical potential within about 2 V of lithium metal.

6. The device according to claim 4, wherein the anode comprises a Li-containing material having an electrochemical potential within 1.5 V of lithium metal, and the organic plastic matrix comprises succinonitrile.

7. The device according to claim 5, wherein the Li-containing material comprises lithium metal, a lithium alloy, lithium intercalated into hard or soft carbon, lithium intercalated into an oxide, a nitride or a phosphide, lithium inserted into a compound or composite by displacement, or a mixture thereof.

8. The device according to claim 6, wherein the Li-containing material comprises lithium metal or lithium intercalated into graphite.

9. The device according to claim 4, wherein the cathode comprises Li$_{1+x}$(Mn,Ni,Co)$_{1-x}$O$_2$, LiFePO$_4$, V$_2$O$_5$, LiCoO$_2$, Li(Ni,Co)O$_2$, LiMn$_2$O$_4$, LiNi$_{0.5}$Mn$_{1.5}$O$_4$, Li(Mn$_{0.5}$Ni$_{0.5}$)O$_2$, Li$_{1+x}$(Mn,Ni)$_{1-x}$O$_2$ or a mixture thereof.

10. The device according to claim 8, wherein the cathode comprises LiFePO$_4$ or Li$_{1.2}$Mn$_{0.4}$Ni$_{0.3}$Co$_{0.1}$O$_2$.

11. The device according to claim 4 having an operating voltage of up to 5 volts.

12. The device according to claim 4 having an operating voltage of from 0.5-4.6 volts.

13. The device according to claim 10 having an operating voltage of from 2.5-3.9 volts.

14. The device according to claim 4 which is an electrochemical cell.

15. The device according to claim 13 which is a battery.

16. The electrolyte according to claim 2 wherein the one or more other dopants comprises lithium bis-trifluoromethanesulphonylimide (LiTFSI).

17. The electrolyte according to claim 16, wherein the LiTFSI is present in an amount of 1-20 mol%.

18. The electrochemical device according to claim 4, wherein the organic plastic crystal matrix further comprises lithium bis-trifluoromethanesulphonylimide (LiTFSI) in an amount of 1-20 mol%.

19. The device according to claim 6, wherein the Li-containing material is lithium metal.

* * * * *